United States Patent [19]
Kuranuki et al.

[11] Patent Number: 5,198,967
[45] Date of Patent: Mar. 30, 1993

[54] SOLID ELECTROLYTIC CAPACITOR AND METHOD FOR MAKING SAME

[75] Inventors: Kenji Kuranuki, Uji; Masayuki Taniguchi, Tsuzuki; Hiromichi Yamamoto; Shurou Nakajima, both of Uji, all of Japan

[73] Assignee: Matsushita Electric Industrial Co., Ltd., Osaka, Japan

[21] Appl. No.: 757,745

[22] Filed: Sep. 11, 1991

[30] Foreign Application Priority Data

Sep. 13, 1990 [JP] Japan ................................. 2-245565

[51] Int. Cl.$^5$ ............................................. H01G 9/00
[52] U.S. Cl. ................................. 361/523; 29/25.03
[58] Field of Search ............... 29/25.03; 361/523–525, 361/535, 538–540

[56] References Cited

U.S. PATENT DOCUMENTS

| | | | |
|---|---|---|---|
| 3,773,628 | 11/1973 | Misawa et al. | 204/15 |
| 3,950,842 | 4/1976 | Fournier et al. | 29/25.03 |
| 4,578,736 | 3/1986 | Brown | 361/306 |
| 4,803,596 | 2/1989 | Hellwig et al. | 361/525 |
| 4,805,074 | 2/1989 | Harakawa et al. | 361/525 |
| 4,935,848 | 6/1990 | Yamane et al. | 361/534 |

FOREIGN PATENT DOCUMENTS

| | | |
|---|---|---|
| 0283239 | 9/1988 | European Pat. Off. |
| 3819851 | 12/1989 | Fed. Rep. of Germany |
| 63-239917 | 10/1988 | Japan |

*Primary Examiner*—Donald A. Griffin
*Attorney, Agent, or Firm*—Panitch Schwarze Jacobs & Nadel

[57] ABSTRACT

A solid electrolytic capacitor which includes an outer casing, a dielectric positive electrode oxide film layer on a planar valve metal, a plurality of capacitor elements each having a conductive macromolecules layer and a conductive layer overlying the conductive macromolecules layer at a predetermined portion of the dielectric positive oxide film layer, and two pairs of two-terminal external connectors each having a positive electrode and a negative electrode, the external connectors being extended from opposite sides of the casing and bent over other side than the opposite sides.

8 Claims, 9 Drawing Sheets

SOLID ELECTROLYTIC CAPACITOR AND METHOD FOR MAKING SAME

BACKGROUND OF THE INVENTION

1. Field of the Invention

The present invention relates to a solid electrolytic capacitor using conductive macromolecules as a solid electrolyte, and more particularly, to a solid electrolytic capacitor which is encased in a synthetic resin molded casing, hereinafter referred to as the "casing". The present invention also relates to a method for producing solid electrolytic capacitors of this kind.

2. Description of the Prior Art

In line with the recent trend in which electronic circuits are digitized and have high frequencies, capacitors used therefor are required to have high reliability, small-size, large capacitance and excellent high frequency characteristics. Solid electrolytic capacitors, which are inherently small-sized and have large capacitance, have been improved by using solid electrolytes of newly developed conductive macromolecules. As a result, they have a high electroconductivity of conductive macromolecules of about $10^4$ s/m as compared with that of manganese dioxide ($10^0$ s/m or TCNQ salt ($10^{20}$ s/m) and high thermal stability. The improved solid electrolyte capacitors have desirable characteristics such as stable frequency characteristics of impedance and thermal characteristics within a wide range.

However, it is necessary to reduce inductance caused by external terminals of the capacitor in accordance with increases in frequency. It is also required to occupy a minimum space on a circuit substrate in order to reduce the size of the electronic devices. Furthermore, the consistent reliability of capacitors are essential so as not to spoil the sophisticated, long-term electronic devices. Therefore, chip type elements which are small-sized, highly reliable, and flexible in mounting, that is, can be mounted in a desired position without occupying a large space, such as are capable of being, vertically stacked or horizontally arranged, are desirable. Conventional elements are disadvantageous in that inductance is likely to become large and mounting flexibility is lacking.

Figure 17A:
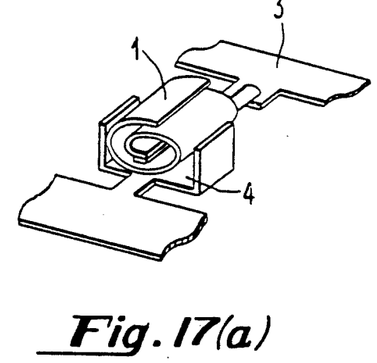
FIG. 17(a) is a perspective view showing the capacitor element having a coiled positive electrode known in the art.
Figure 17B:
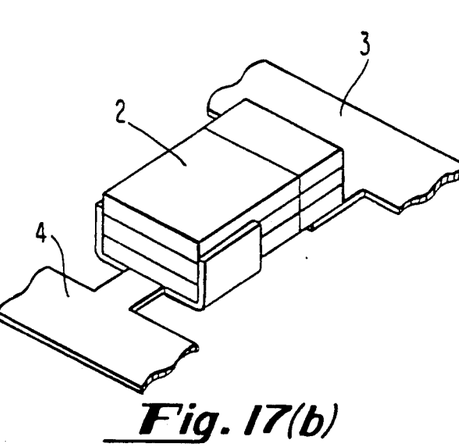
FIG. 17(b) is a perspective view showing the capacitor element having a laminate of positive electrodes known in the art.
Figure 18:
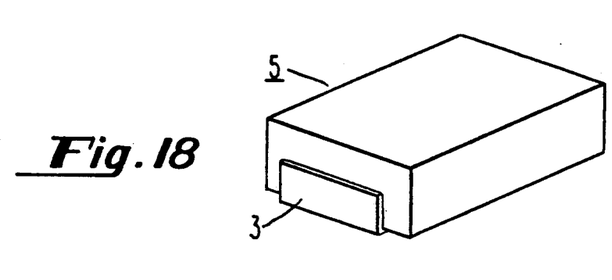
FIG. 18 is a perspective view showing the conventional chip-type solid electrolytic capacitor.

Referring to FIGS. 17 and 18, a conventional chip type solid electrolytic capacitor will be described, as follows:

The solid electrolyte capacitor uses conductive macromolecules as solid electrolyte. The type shown in FIG. 17(a) is covered with positive electrode foils, and the type shown in FIG. 17(b) is provided with plain positive electrode foils, and FIG. 18 shows a further type of low chip solid electrolyte capacitor element. The positive foils are etched to form an oxide film as dielectric. Then a conductive macromolecular layer, a graphite layer, and a silver paint layer are formed on the portion except the lead line of the positive electrode. A positive electrode terminal 3 and a negative electrode terminal 4 are connected in parallel with the capacitor elements 1 and 2, respectively. Then, the capacitor elements are encased in casing such as a transfer mold or a pot. The whole body is flat, with a wide bottom and a short height as shown in FIG. 18.

The conventional types shown in FIGS. 17(a) and 17(b), and FIG. 18 are disadvantageous in that when they are densely mounted on a circuit substrate, they horizontally expand and occupy a large space of the substrate. In addition, the positive electrode terminal 3 and negative electrode terminal 4, which are both external terminals, are opposed to each other so that a current is difficult to efficiently pass through the capacitor elements 1 and 2 through the surfaces of a land of the print wirings. As a result, the capacitance of the capacitor is not fully utilized, and inductance cannot be minimized.

Furthermore, the conventional solid electrolyte capacitors are disadvantageous in that they are difficult to be mounted without losing reliability. When the solid electrolyte capacitors are to be coated with synthetic resins as described above, they are placed at a high temperature such as 250° C. This high temperature unfavorably affects the quality of the capacitors; such as the deterioration of characteristics. The reasons are as follows:

(1) In order to improve solderability, the surface of the frame functioning as the terminal is plated with tin or any other metal which has a relatively low melting point. The metal is likely to melt in the mounting process to cause cavities between the external synthetic resins and the frame.

(2) Because of the larger coefficient of expansion of the synthetic resin used in mounting than that of the metal of the frame, the frame and the synthetic resin are likely to separate from each other, thereby causing a gap therebetween.

The laminated type shown in FIG. 17(b), which has a large capacitance for its relatively small size, is nevertheless disadvantageous in that the connection between the capacitor elements, and between the capacitor elements and the frame are not reliable.

Figures 19A, 19B:
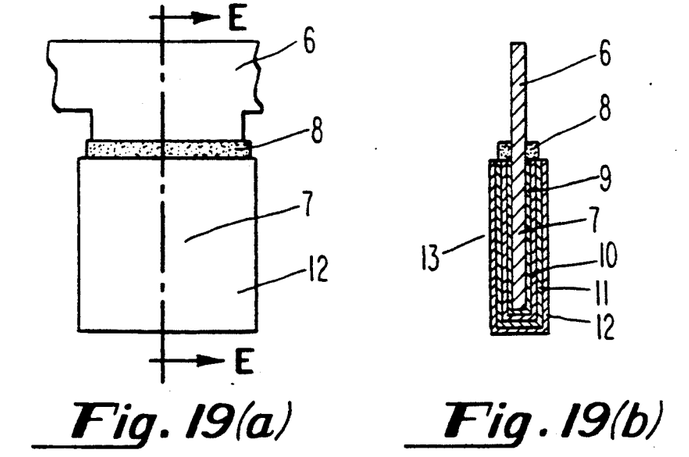
FIG. 19(a) is an enlarged fragmentary view showing a capacitor element having projections, mounted on the side of an aluminum etched foil in the prior art.
FIG. 19(b) is a cross-sectional view taken along the line E—E of FIG. 19(a)
Figure 20:
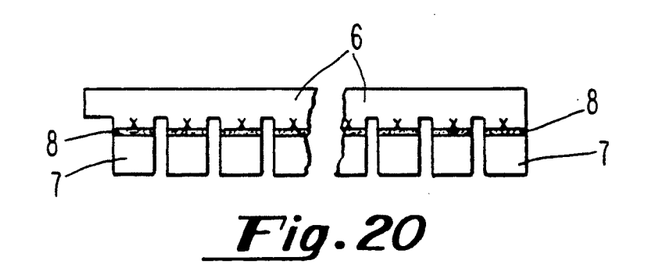
FIG. 20 is a plan view showing the aluminum etched foil having projections in the prior art.

Japanese Laid-Open Patent Publication No. 63-239917 discloses another laminated type as illustrated in FIGS. 19 and 20 which uses conductive macromolecules as a solid electrolyte. This type includes an etched aluminum foil strip 6 having several projections 7 along one of the edges. Each projection 7 is divided into a negative electrode portion and a positive electrode portion by a photoresist band 8. The negative electrode is composed of an aluminum oxide film layer 9 as dielectric, a polymer layer 10 of conductive macromolecules made of pyrrole as heterocyclic compound polymer layer, a graphite layer 11 as conductive layer for the leading terminal, and a silver paste layer 12.

Figures 21A, 21B:
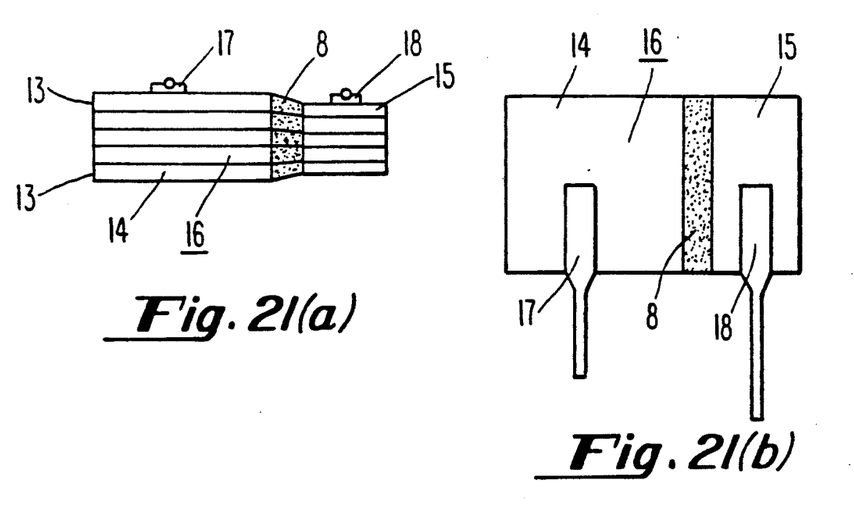
FIG. 21(a) is a side view showing a plurality of capacitor elements mounted in layer in the prior art.
FIG. 21(b) is a plan view showing the capacitor element shown in FIG. 21(a).

A plurality of laminated units 13 each constructed in this way are stacked as shown in FIG. 21(a), wherein the projections 7 overlay one another to which pressure is applied at high temperatures. The silver paste layer 12 is half dried, and a part 14 of the laminated unit 13 is joined to a part of the other laminated unit 13 so as to obtain a union of the two units 13, wherein portions 15 (portions marked "x" in FIG. 20) of the etched aluminum foil strips 6 are welded to each other. In this way, a solid electrolyte capacitor 16 is formed.

Subsequently, the half dried silver paste layer 12 is finally dried so as to enable the negative electrode 14 to join to the surface of a planar negative terminal 17 under pressure. A planar positive electrode terminal 18 is joined to the positive electrode 15 by spot welding or ultrasonic welding to form a capacitor element which is finally coated with synthetic resin.

In addition to the disadvantages pointed out above, the known solid electrolytic capacitor are disadvantageously lacking in the reliability of the connection of the positive electrode. Valve metals such as aluminum are liable to oxidation in the atmosphere and oxide films are likely to be formed on the surface. When such oxide films are layered, it is difficult for spot welding or ultra sonic welding to penetrate all the oxide film layers and effect a firm welding joint therethrough.

When an apparently successful welding joint is made, contact resistance is large thereby causing the joined elements to separate from each other when the capacitors are used. This is because the welding energy only reaches the oxide film layers but does not spread through all the welds. When resistance welding process such as spot welding is applied, it often happens that other current than the welding current flows through the oxide film layers and breaks them and the conductive macromolecular film.

SUMMARY OF THE INVENTION

The solid electrolyte capacitor of the present invention which overcomes the above-discussed and numerous other disadvantages of the prior art, comprises an outer casing, a dielectric positive electrode oxide film layer on a planar valve metal, a plurality of capacitor elements each having a conductive macromolecular layer and a conductive layer overlying the conductive macromolecular layer at a predetermined portion of the dielectric positive oxide film layer, and two pairs of two-terminal external connectors each having a positive electrode and a negative electrode, the external connectors being extended from opposite sides of the casing and bent over other side than the opposite sides.

In a preferred embodiment, the casing is provided with grooves on the surface in and along which the external connectors are bent below the level of the grooved surface.

Alternatively, the solid electrolytic capacitor comprises an outer casing, a dielectric positive electrode oxide film on a planar valve metal, a capacitor element having a conductive macromolecular layer and a conductive layer overlying the conductive macromolecules layer at a predetermined portion of the dielectric positive oxide film, the capacitor elements being laminated to form a laminate in which exposed portions of the dielectric positive oxide film layers are mutually overlaid and the conductive layers are mutually overlaid with gaps therebetween being electrically filled in with a conductive adhesive and two pairs of two-terminal external connectors each having a positive electrode and a negative electrode, the external connectors being extended from opposite sides of the casing and bent over other side than the opposite sides.

In a preferred embodiment, the casing is provided with grooves on the surface in and along which the external connectors are bent below the level of the grooved surface.

According to another aspect of the present invention, there is provided a method for producing a solid electrolytic capacitor, the method comprising the steps of preparing a valve metal plate, forming an oxide film layer on the valve metal plate, dividing the surface of the valve metal plate into a negative electrode section and a positive electrode section by an insulating layer, forming a conductive laminate including a conductive material coated layer, a conductive macromolecular layer, a graphite layer, and a silver paint layer in the negative electrode section so as to form a capacitor element, laminating a plurality of the capacitor elements wherein the negative electrode section is connected a conductive frame, and connecting the positive electrode section to another portion of the frame, bending a top end of other portion of the frame at 180° until the bent portion pinches the positive electrode sections kept contact with each other, welding the frame to the capacitor elements by laser, and encasing the capacitor elements and part of the frame in a casing.

According to a further aspect of the present invention, there is a method for producing a solid electrolytic capacitor, the method comprising the steps of preparing a valve metal plate, forming an oxide film layer on the valve metal plate, forming a capacitor element including a conductive material coated layer, a conductive macromolecular layer, and a conductive layer at a predetermined portion of the valve metal plate, connecting both a valve metal plate portion of the capacitor element or a laminate thereof and the conductive layer to a conductive frame functioning as a lead, and encasing the capacitor element or the laminate thereof and part of the frame in a casing, therein the surface of the frame is coated with copper and roughened.

In a preferred embodiment, the surface of the frame is roughened by a sand blasting method.

In a preferred embodiment, the surface of a frame is roughened by an electrolytic etching method.

Thus, the invention described herein makes possible the objectives of (1) providing a reliable and heat-resistant chip-type solid electrolyte capacitor, (2) providing a chip-type solid electrolyte capacitor which can be mounted without occupying a large space, and (3) providing a method for producing an electrically self-contained compact chip-type solid electrolyte capacitor.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

First, a solid electrolytic capacitor element used in the invention is fabricated by the following methods.

Figure 1:
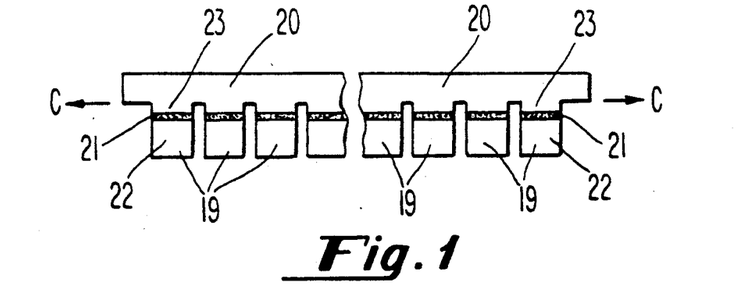
FIG. 1 is a plan view showing a comb-shaped electrode assembled with a solid electrolytic capacitor according to the present invention.

Referring to FIG. 1, an aluminum foil having a thickness of 100 $\mu$m is etched so as to be porous by a known method, and then an oxide film is formed on the surface by a chemical treatment. The resulting chemical-treated aluminum foil is punched to form a comb-shaped electrode 20 having projections 19. An insulation layer 21 is provided at a predetermined position of the projections 19, thereby forming a negative electrode 22 and positive electrode 23. It is preferable to punch the foil after it is subjected to the chemical treatment. The comb-shaped electrode 20 of FIG. 1 can be formed either by applying an insulating coating after punching or attaching an adhesive insulating tape, such as heat resistant polyimide tape, to the chemical-treated aluminum foil.

Figure 2A:
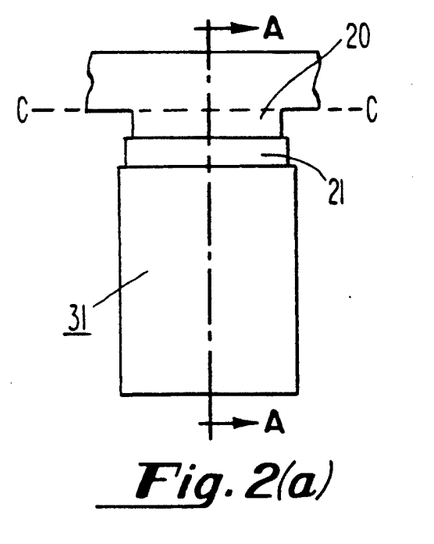
FIG. 2(a) is an enlarged view showing a comb-shaped electrode used in the solid electrolytic capacitor.
Figure 2B:
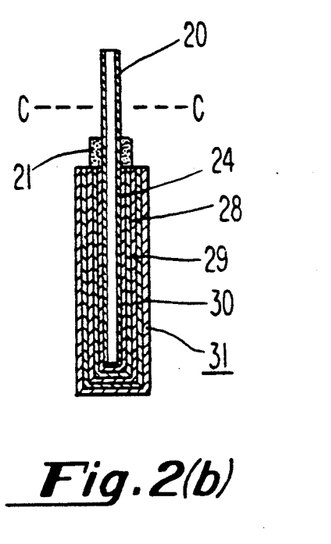
FIG. 2(b) is a section view taken along the line A—A of FIG. 2(a)

Then, the entire surface of the negative electrode 22 is submerged in a chemical liquid and the cut surface and the chemically treated coat is reformed. Then, the comb-shaped negative electrode 22 is submerged in a manganese nitrate solution to form a conductive layer 24 of manganese dioxide as shown in FIG. 2(b). If it is required to reform the oxide film deteriorated or deformed by the heat treatment, the chemical treatment can be repeated. The conductive layer 24 is essential for growing the conductive macromolecules in the subsequent steps.

Figure 3:
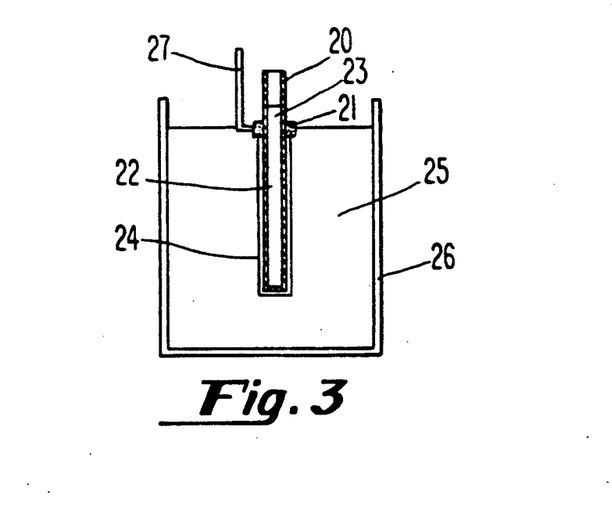
FIG. 3 is a schematic view showing an electrolytic polymer tank for forming the conductive macromolecular film used in the solid electrolytic capacitor.

Then, as shown in FIG. 3, an electrolytic polymer solution 25 such as a mixture of pyrrole and sodium triisopropyl naphthalene sulfonate, is contained in a stainless steel container 26 which functions as a counter electrode. The comb-shaped electrode 20 is inserted into the middle of the insulation layer 21 in the container. A tip of the stainless steel electrode 27 corresponding with the comb-shaped electrode 20 is in contact with the part of the insulation layer 21 closest to the conductive layer 24 of the negative electrode 22. Under this condition, the stainless steel electrode 27 serves as the positive electrode and the containers as the negative electrode, and the voltage is applied between both electrodes to effect electrolytic polymerization. As shown in FIG. 2(b), the conductive macromolecular layer 28 is formed on the conductive layer 24.

In addition, a conductive graphite layer 29 and a silver paint layer 30 are formed on the conductive macromolecular layer 28 as shown in FIG. 2(b). The graphite layer 29 is thin so as to use a baking method, but the silver paint layer 30 has a thick bottom so as to prevent lamination, so that a uniform coating method is desirable. The resulting comb-shaped electrode 20 is cut along C—C of FIGS. 1 and 2(a) and 2(b) to form a single capacitor element 31. Considering productive yield and manufacturing process, a method of laminating in the comb-shaped electrode 20 is not recommended. For example, a productive yield of 90% can be attained from a single capacitor element 31, whereas a productive yield of 59% can be obtained from the lamination of the five single capacitor elements 31 in the comb-shaped electrode 20. Therefore, after checking the quality of the single capacitor elements 31 to pick up good quality elements, the lamination should be performed.

The following examples describes the capacitor element 31 produced by the above method.

EXAMPLE 1

Figure 4A:
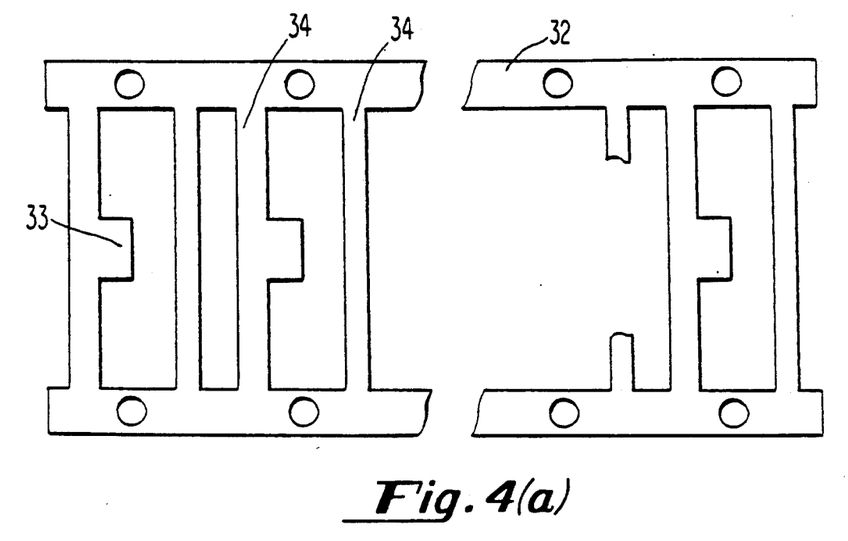
FIG. 4(a) is a plan view of a frame used in the solid electrolytic capacitor of Examples 1 to 4.
Figure 4B:
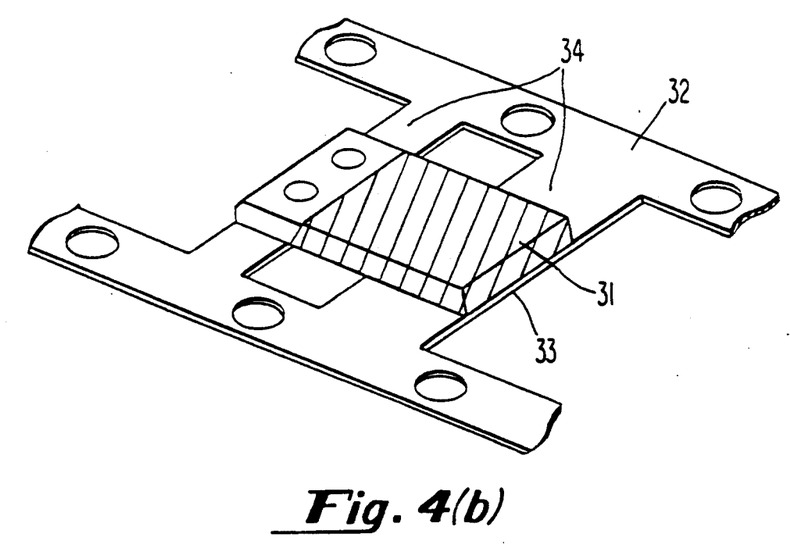
FIG. 4(b) is a perspective view showing a capacitor element mounted on the frame of FIG. 4(a)
Figure 5:
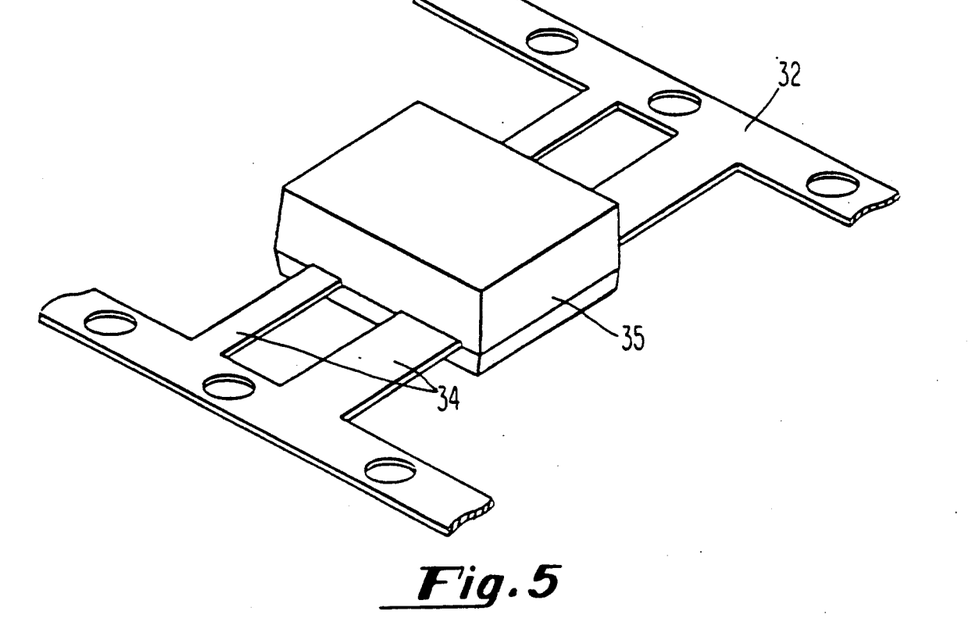
FIG. 5 is a perspective view showing a state in which a solid electrolytic capacitor element is molded and encased in epoxy resin while it is mounted on the frame.
Figure 6:
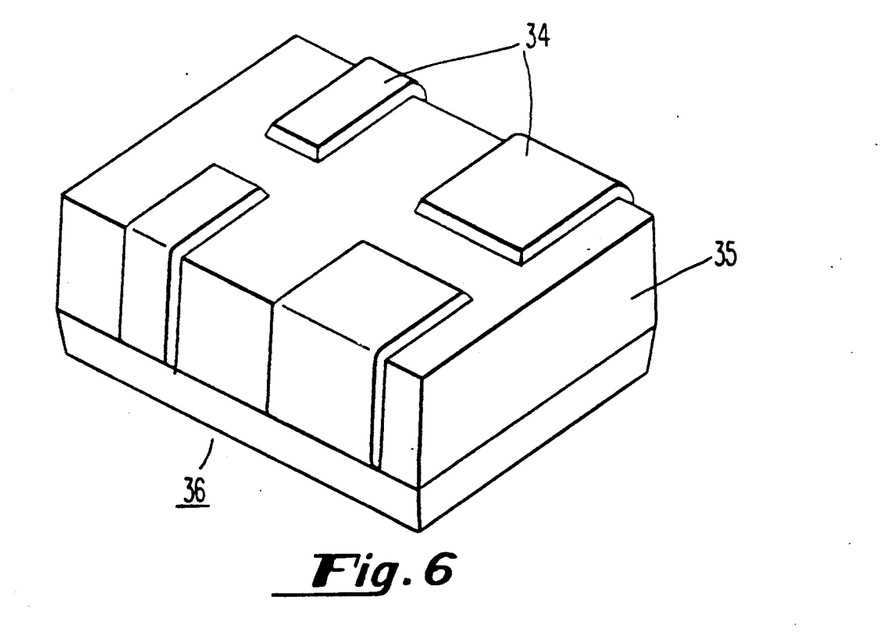
FIG. 6 is a perspective view showing the chip solid electrolytic capacitor of Examples 1 and 2.

Referring to FIG. 4(a), a frame 32 of iron having a thickness of 0.1 mm is prepared so as to produce twenty pieces of capacitors. A conductive adhesive is applied to a negative electrode connection 33 on the frame 32 and a capacitor element 31 is placed thereon so as to constitute the negative electrode as shown in FIG. 4(b). In the positive electrode, an external connector 34 is electrically connected to the capacitor element 31 by YAG laser welding. Then, the bare element is coated with epoxy resin by means of a mold transfer machine of 200 ton in capacity as shown in FIG. 5 so as to be encased in a molded casing 35. The external connector 34 has four terminals of which two terminals function as a positive electrode and the other two as a negative electrode. They are taken out in opposite directions from different sides of the casing 35. In this way an encased capacitor is finished as shown in FIG. 6.

The encased capacitors are cut away from the frame 32. Then, a voltage of 20 V is applied between the positive and negative electrodes. Aging is conducted at high temperatures so as to avoid electrical leakage. Then, the four external connectors 34 are submerged in solder for coating. The connectors 34 are bent over the casing 35. A finished capacitor is shown in FIG. 6, which is a four-terminal chip-type solid electrolytic capacitor 36 of 16 V 4.7 $\mu$F. This solid electrolytic capacitor 36 uses a single capacitor element 31 having the projections 19 of 4×9 mm.

EXAMPLE 2

Figure 7:
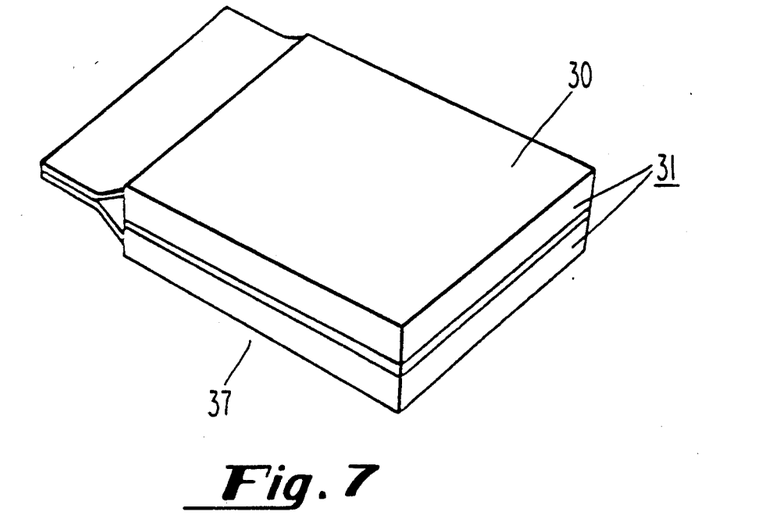
FIG. 7 is a perspective view showing a laminate having two capacitor elements used in the solid electrolytic capacitor.

Referring to FIG. 7, the capacitor includes two capacitor elements 31 wherein the positive electrode 23 having an exposed dielectric in one capacitor element 31 is joined to that of the other capacitor element 31, and the negative electrode 22 of the conductive layer in one capacitor element is joined to the negative electrode of the other capacitor element with the conductive adhesive therebetween to form a capacitor element laminate 37. The capacitor element laminate 37 is placed on the frame 32. By following the same process as that of Example 1, the four-terminal chip-type solid electrolytic capacitor of 16 V 10 μF is achieved.

EXAMPLES 3 and 4

Figure 8:
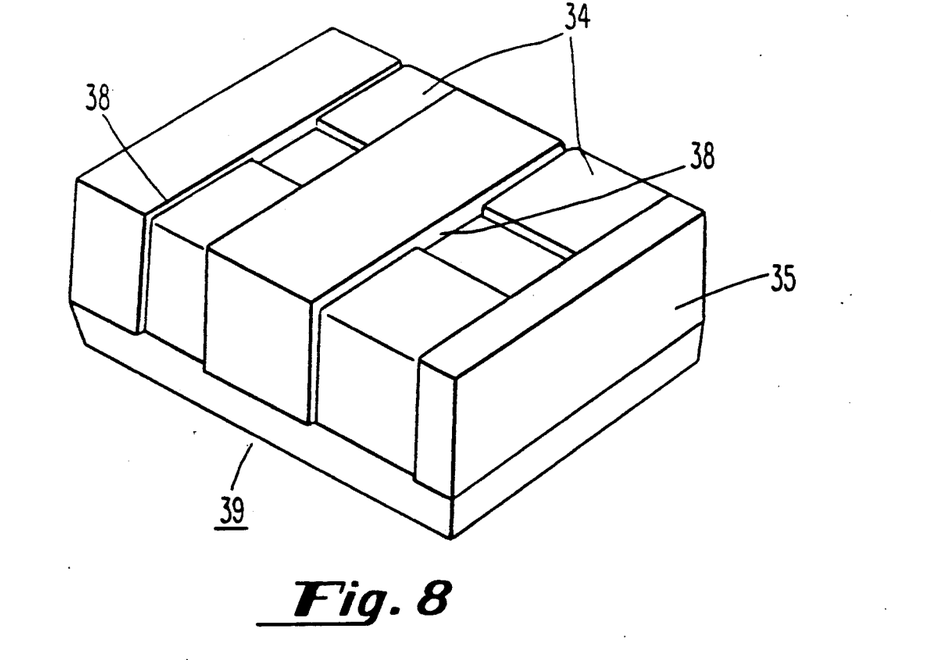
FIG. 8 is a perspective view showing the solid electrolytic capacitor of Examples 3 and 4.

Referring to FIG. 8, a casing 35 has a different shape by using a mold different from that used in Examples 1 and 2. The casing 35 is provided with grooves 38 each of which is wider and deeper than the planar external connector 34. More specifically, the four-external connector 34 is bent in and along the grooves 38. By following the same process as that of Examples 1 and 2, the four-terminal chip-type solid electrolytic capacitors 39 of 16 V 4.7 μF and 16 V 10 μF are formed.

The capacitor element laminate 37 described as Examples 2 and 4 include two capacitor elements 31. The number of capacitor elements is not limited to two but three or more capacitor elements can be used so as to form a chip-type solid electrolytic capacitor.

Figure 9:
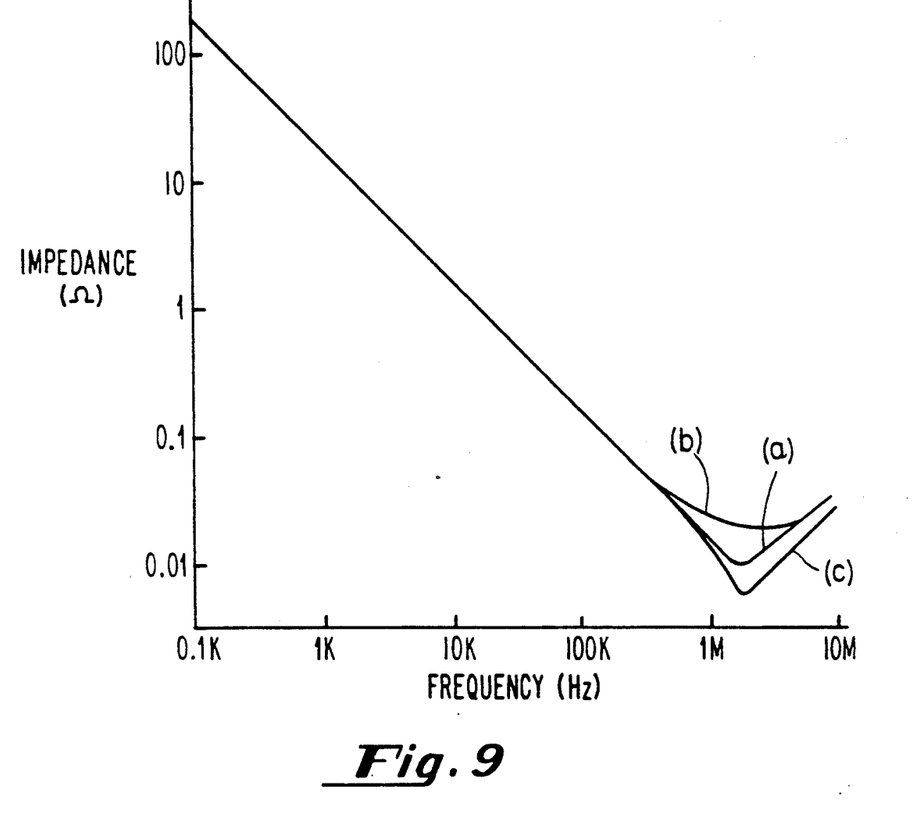
FIG. 9 is a graph showing impedance characteristics in various mounting methods in the solid electrolytic capacitor according to the present invention.

Referring to FIG. 9, which shows the frequency characteristics of impedance occurring in a chip-type solid electrolytic capacitor having two capacitor elements. Table 1 shows the relationship of the shape of land and an equivalent circuit. From Table 1, the graph (a) shows a case where two terminals are vertically mounted, and the graph (b) shows a case where two terminals are horizontally mounted, the graph (c) shows a case where four terminals are horizontally mounted.

As is evident from FIG. 9 and Table 1, in the cases shown as the graphs (a) and (b), L-component inductance of the external connector 34 is in parallel with the land of the circuit substrates, so that a current passes through the land. As a result, the L-component inductance is conducive to decrease impedance, whereas in the case shown by the graph (c) a current passes through the entire external connector 34. Therefore, the capacitance of the capacitor is fully used, thereby decreasing impedance.

Thus, the four-terminal type is advantageous in having low impedance even in the high frequency area in which L-component inductance would otherwise become a problem.

The chip-type solid electrolytic capacitor of Examples 1 to 4 can be stacked vertically or arranged horizontally. As shown in Examples 3 and 4, when the the casing 35 is provided with the grooves 38 and each four-terminal external connector 34 is bent in and along the groove 38, the connectors 34 are below the level of the surface of the casing 35, thereby minimizing the size of the casing 35 without having any projections.

EXAMPLE 5

Figure 10:
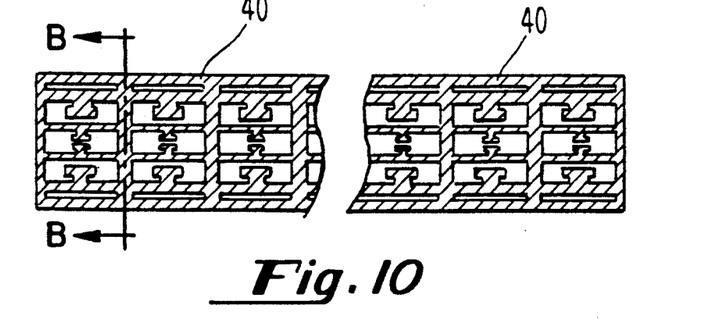
FIG. 10 is a vertical cross-sectional view showing a frame (metal frame) functioning as a lead terminal used in the solid electrolytic capacitor of Examples 5 to 9.
Figure 11A:
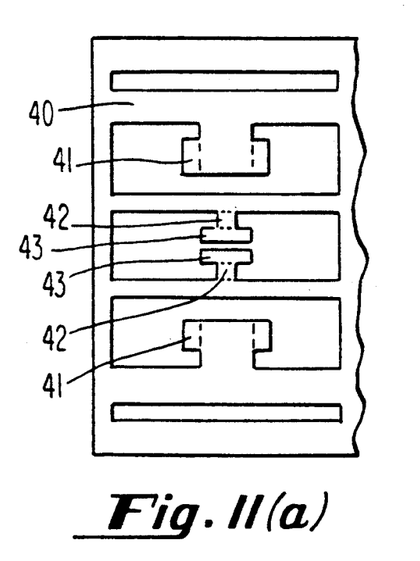
FIG. 11(a) is an enlarged fragmentary view of the frame taken along the line B—B in FIG. 10.
Figure 11B:
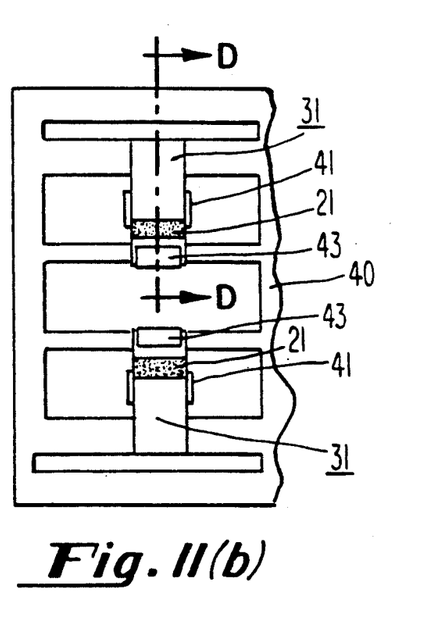
FIG. 11(b) is a plan view showing the capacitor elements mounted on the frame.
Figure 12:
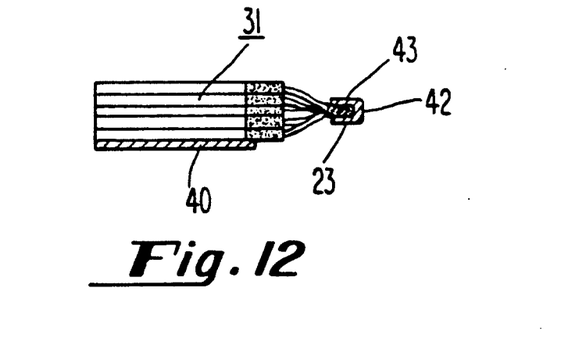
FIG. 12 is a cross-sectional side view of the capacitor elements mounted on the frame as the solid electrolytic capacitor of Examples 5 to 9, taken along the line D—D of FIG. 11(b)

Referring to FIGS. 10, and 11(a) and 11(b), the capacitor element 31 is mounted on the frame of metal 40 as a leading terminal. The frame 40 is fabricated by punching an iron (SPCC) plate having a thickness of 0.1 mm which is plated with copper to a thickness of 3 μm and tin to a thickness of 3 μm. Then, sand-blasting is applied to roughen the surface of the iron plate. In the frame 40, the positive and negative mounts 41 and 42 shown in FIG. 11(a) are bent at a right angle as indicated by the dotted line. A small amount of silver paint is applied as an adhesive to gaps between the negative electrodes 22, and between the negative electrodes 22 and the frame 40 between the negative electrode 22 and the frame 40. A plurality of capacitor elements 31 are formed. A tip 43 of the positive electrode mount 42 is bent at a right angle. As shown in FIGS. 11(b) and 12, the positive electrode 23 of the capacitor element 31 is interposed within the frame 40. The tip 43 of the positive electrode mount 42 is welded by laser at two or three spots.

In order to achieve successful laser welding, it is required that the aluminum foils at the expected welding spots and the frame 40 are well melted and evenly joined to each other. The frame 40, which is usually made of iron, is plated with copper, nickel, tin or any other solder. The melting point of iron is 1535° C., whereas that of aluminum is 660° C., that of Ta is 2996° C., that of Nb is 2468° C. The melting points of iron is different from that of the valve metal, and the metal having a lower melting point is vaporized earlier than the other, thereby producing vacancies. Sufficient welding heat is required so as to penetrate the layered oxide films on the aluminum foils.

When five aluminum foils each having a thickness of 100 μm are laminated, the total thickness becomes 500 μm. In the negative electrode 22, when an aluminum foil, a conductive macromolecules layer 28, a graphite layer 29 and a silver point layer 30 each having a thickness of about 500 μm amount to 2.5 mm in thickness. If the aluminum foils constituting the positive electrodes 23 are merely laminated, interface gaps of 0.4 mm will occur between the positive electrodes 23. These gaps prevent successful welding.

Figure 13A:
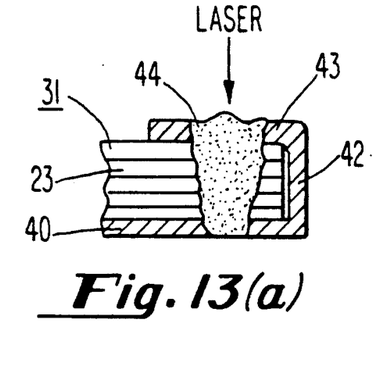
FIG. 13(a) is a cross-sectional view showing a desirable welding state of the positive electrode by laser according to Examples 5 and 6.
Figure 13B:
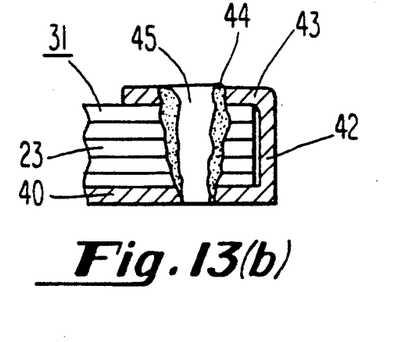
FIG. 13(b) is a cross-sectional view showing an undesirable welding state of the positive electrode by laser according to Examples 5 and 6.
Figure 14:
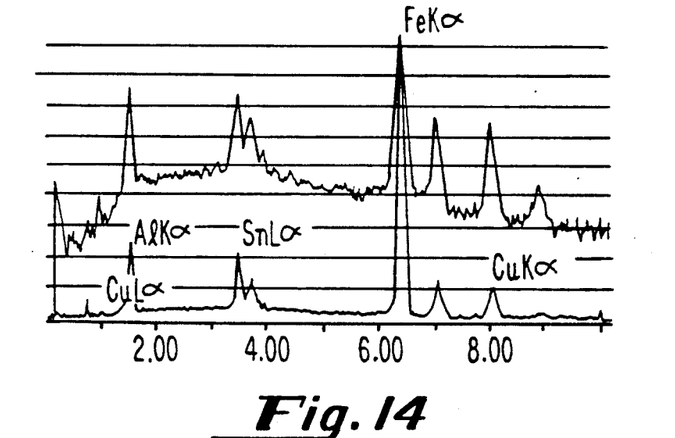
FIG. 14 is a graph showing an analysis of constituents of welds by laser welding applied to solid electrolytic capacitors according to Examples 5 and 6.

In Example 5, the tips 43 of the positive electrode mount 42 are bent at right angles, that is, the positive electrode mount 42 is bent twice, totally at 180° into a shape shown in FIGS. 11(b) and 12 in which the layers are densely laminated. In this form a laser welding is applied as shown in FIG. 13(a). The metals of the positive electrode mount 42 and the aluminum foil of the positive electrode 23 are melted to unite with each other. FIG. 14 shows an analysis achieved by an X-ray microanalyzer. The graph shows that the Al, Fe, Cu and Sn are uniformly melted. If excessively intensified laser beams are applied, a cavity is caused because the metal having a low melting point is vaporized as shown in FIG. 13(b). For example, when optical fiber is used by SI (step index) method, the bottom parts are melted as shown in FIG. 13(b).

When there is a gap between the aluminum foils of the positive electrode 23 having multiple capacitor elements 31, they are not uniformly melted. Therefore, the welding is likely to become impossible, or a similar state to that shown in FIG. 13(b) is reached. If the laser beams are too weak, the welding heat is unlikely to reach the bottom.

In carrying out Example 5, since as an oscillating method a YAG laser method is better than a carbonic acid gas laser method, the YAG laser method was used because of the suitability for small energy spot welding. A relatively small energy was continuously applied to small spots. To facilitate deep and concentrated spot welding, a GI (grated index) type optical fiber was used instead of an SI type optical fiber.

Figure 15:
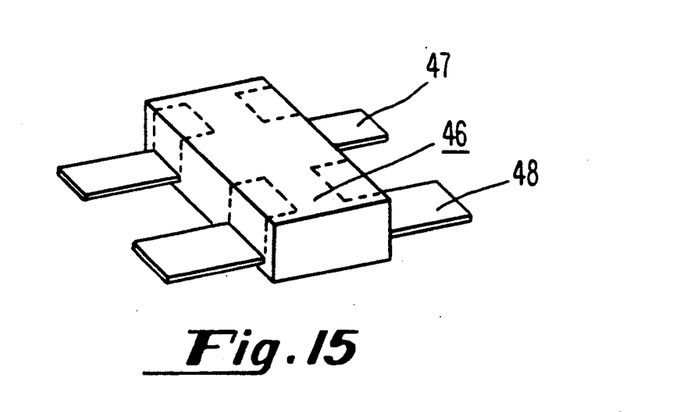
FIG. 15 is a perspective view showing the solid electrolytic capacitor of Examples 5 and 6.

In Example 5, the metal portion of the positive electrode mount 42 and the positive electrode 23 of the capacitor element 31 are melted by laser, and then the silver paint layer 30 of the negative electrode 22 is hardened. Consequently, the frame 40 is wholly disposed on the mold and encased in epoxy resin. The terminals are cut away so as to obtain a self-contained solid electrolytic capacitor 46 as shown in FIG. 15. The positive electrode terminals 47 and the negative electrode terminals 48 of the solid electrolytic capacitor 46 use a part of the frame 40 as a lead. The positive electrode terminals 47 and the negative electrode terminals 48 are bent along the casing, thereby obtaining a chip-type solid electrolytic capacitor.

EXAMPLE 6

The metal portion of the positive electrode mount 42 and the positive electrode 23 of the capacitor element 31 are welded by laser using optical fiber of an SI method. The same procedure as in Example 5 is followed. Thus a solid electrolytic capacitor is obtained.

COMPARATIVE EXAMPLE 1

Obtaining a solid electrolytic capacitor by joining the metal portion of the positive electrode mount 42 of the frame 40 to the positive electrode 23 of the capacitor element 31 by resistance welding without changing the other procedures from those for Example 5. However, it was found difficult to weld through the stack of aluminum foils of the positive electrode 23. Comparative example 1 was found unsuitable for producing solid electrolytic capacitors.

Tables 2 and 3 show the results of a reliability test to measure the initial characteristic and thermal shock tests on ten solid electrolytic capacitors of Examples 5 and 6 (which were measured by repeating the maintenance of each testpiece at $-40°$ C. for thirty minutes, and at 150° C. for thirty minutes, 100 times alternately). Each testpiece was made of aluminum foil having projections 19 of $3 \times 7$ mm at a voltage of 28 V and having five sheets of capacitor elements. The rating of these solid electrolytic capacitors was 10 V 22 $\mu$F.

Table 2 shows that in Example 5 impedance in the high frequency area (500 kH$_z$) is almost the same before and after the tests, whereas Table 3 shows that in Example 6 impedance is greatly increased after the tests.

It will be appreciated from Example 5 that when the positive electrode mount 42 of the frame 40 and the tip 43 thereof are joined to the positive electrode 23 having a plurality of capacitor elements 31 under an optimum radiation of laser beams, a desirable welded state will be attained. The welded state enhances the quality of solid electrolytic capacitor, that is, a small size, large capacitance, and low impedance even in a high frequency area.

EXAMPLE 7

An Iron (SPCC) plate having a thickness of 0.1 mm was punched and plated with copper to a thickness of 1 $\mu$m to form a copper film layer. Then, the sand-blasting was applied to roughen the surface of the copper film layer, thereby obtaining the frame 40 (metal frame) as the lead terminal as shown in FIGS. 10 and 11($a$) and 11($b$). A solid electrolytic capacitor was formed with this frame 40 by the same process as that of Example 5.

The airtightness of the solid electrolytic capacitor was assessed by placing it in a tank heated to 250°±5° C. for five minutes, and after taking it at room temperature out of the tank, the capacitor was allowed to cool. This process was repeated three times. Afterward, a sample of the treated capacitors was maintained in the atmosphere of radioactive Kr 85 at a pressure of 0.7 MP$_a$ for thirty minutes. Then the testpiece was exposed to light on a photographic plate. Capacitors which were found to contain Kr as a result of poor airtightness were discarded. The results are shown in Table 4.

EXAMPLE 8

An iron (SPCC) plate having a thickness of 0.1 mm was plated with copper. The copper-plated surface of one sample was roughened and that of another sample was not. With these two kinds of frames solid electrolytic capacitors were assembled in the same manner as Example 7. The results are shown in Table 4.

EXAMPLE 9

The surface of an iron (SPCC) plate having a thickness of 0.1 mm was roughed by electrolytic etching in an aqueous solution of hydrochloric acid 10% and sulfuric acid 0.5% at a current density of 1 A/dm$^2$. Then, the surface was plated with copper to form a copper film layer. In this way a frame was obtained, and with this a solid electrolytic capacitor was assembled. This capacitor was tested for airtightness. The results are shown in Table 4.

COMPARATIVE EXAMPLE 2

The surface of an iron (SPCC) plate having a thickness of 0.1 mm was plated with copper to a thickness of 3 $\mu$m, and the copper-plated surface was plated with tin. The tin-plated surface of one sample was roughened, and that of another was not. With these two kinds of samples, capacitors were assembled in the same manner as Example 7. The capacitors were tested for airtightness. Two kinds of roughening were conducted; one was shallow, and the other was deep until the underlying copper layer was exposed. The results are shown in Table 5.

COMPARATIVE EXAMPLE 3

A nickel plate having a thickness of 0.1 mm was punched and the surface was plated with copper. Then the surface was roughened, and with this frame a capacitor was assembled. The capacitor was tested for airtightness and the results are shown Table 5.

Examples 7, 8, 9, and Comparative Examples 2 and 3 demonstrate that the airtightness of solid electrolytic capacitors whose surfaces plated with a lowmelting point metals such as tin is poor. In addition, when the base material is a metal such as iron or nickel, the surface roughening produces no large effects. However, as shown by Examples 7, 8, and 9, when the surface is first plated with copper, and then the copper-plated surface is roughened, airtightness is enhanced. In this case, when the copper-plated surface was additionally thinly plated with tin, so as to improve solderability, and roughened until the underlying copper-layer was exposed, the same effect was achieved. The roughening can be done by a mechanical method such as sand-blasting or a chemical method such as electrolytic etching.

Figure 16:
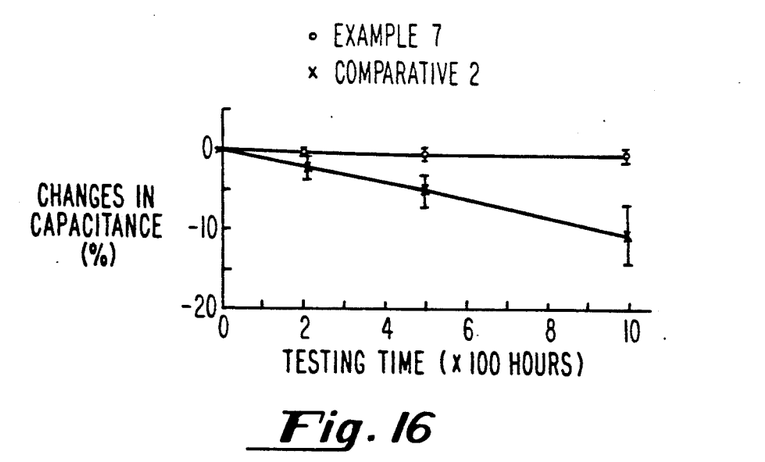
FIG. 16 is a graph of a comparison between the characteristic variation of the solid electrolytic capacitor of Example 7 and that of Comparative Example 2 in the life test at high temperatures.

In order to ensure the above-mentioned effects, a durability test at high temperatures was performed first by preparing ten solid electrolytic capacitors of Example 7 and ten of those of Comparative Example 2 coated with tin to a thickness of 10 μm without roughening the surfaces, and by subjecting each testpiece to heat treatment at 250° C. and then to voltage application of 10 V at 105° C. The results are shown in FIG. 16. In this test the testpieces (capacitor elements) had five elements having projections of 3×7 mm, and were assembled into a solid electrolytic capacitors having a rating of 10 V 22 μF, and were tested.

As shown in FIG. 16, it was found that the capacitance of the solid electrolytic capacitor of Example 7 remained the same after 1000 hours, whereas that of Comparative Example 2 was decreased by 10% or more. In the aforementioned examples, the entire surfaces of the frames were roughened, but it is possible to roughen only the contacting parts with the casing.

In the illustrated embodiments, the frames are made of iron, but other metals such as "iron-base 42 alloy" or nickel-base materials can be used.

In the solid electrolytic capacitor of the present invention, the two-terminals of the four-terminal external connectors function as a positive electrode and the other two as a negative electrode. One positive electrode and one negative electrode are projected in pair from opposite sides of the casing having six sides, and bent over one side other than the sides from which they are projected. As a result, the capacitor can be mounted in a desired position, that is, horizontally or vertically as desired, thereby minimizing the occupancy of space.

When the capacitor is used in a high frequency circuit, the present invention is advantageous in that the current is caused to flow efficiently under the unique land construction having the two-terminal positive external connectors and two-terminal negative external connectors. As a result, the capacitance can be used at maximum with the minimum of inductance. The capacitor can be used in high frequency areas with decreased impedance and without occupying a large space.

In addition, according to the method of the present invention, the capacitor elements, the frame, and the terminals are efficiently welded to each other, thereby ensuring electrical connection without the possibility of electrical discontinuity. This also enhances the reliability of capacitors.

According to the present invention, the copper-plated surface of the frame is roughened, thereby increasing the solderability to a printed circuit and the attachment to the casing. As a result, the capacitors can withstand thermal shocks and thermal contraction. In addition, airtightness is ensured.

TABLE 1

| mark circuit | mount | land formation | equivalent circuit |
|---|---|---|---|
| (a) | vertical two-terminal | ⊕ ▢ ⊖ ▢ | L-component |

TABLE 1-continued

| mark circuit | mount | land formation | equivalent circuit |
|---|---|---|---|
| (b) | horizontal two-terminal | ⊕ ▭ ⊖ ▭ | |
| (c) | horizontal four-terminal | + ▢ + ▢ IN ▢ OUT ▢ | |

TABLE 2

| classification | element No. | initial characteristics | | | | after test |
|---|---|---|---|---|---|---|
| | | capacitance (μF) | tan δ (%) | LC (nA) | impedance (mΩ) | impedance (mΩ) |
| Example 5 | 1 | 21.2 | 0.8 | 34 | 32 | 33 |
| | 2 | 22.7 | 0.9 | 25 | 44 | 46 |
| | 3 | 21.8 | 0.9 | 48 | 28 | 30 |
| | 4 | 22.4 | 0.7 | 32 | 43 | 42 |
| | 5 | 22.3 | 1.0 | 28 | 40 | 41 |
| | 6 | 22.0 | 0.8 | 32 | 39 | 42 |
| | 7 | 21.8 | 0.8 | 29 | 40 | 40 |
| | 8 | 22.6 | 0.8 | 30 | 33 | 34 |
| | 9 | 21.7 | 0.9 | 27 | 32 | 34 |
| | 10 | 23.0 | 0.8 | 28 | 35 | 35 |

TABLE 3

| classification | element No. | initial characteristics | | | | after test |
|---|---|---|---|---|---|---|
| | | capacitance (μF) | tan δ (%) | LC (nA) | impedance (mΩ) | impedance (mΩ) |
| Example 6 | 11 | 21.8 | 0.8 | 23 | 33 | 52 |
| | 12 | 22.4 | 1.0 | 36 | 43 | 60 |
| | 13 | 21.0 | 0.9 | 37 | 38 | 45 |
| | 14 | 22.7 | 0.9 | 40 | 38 | 46 |
| | 15 | 22.8 | 1.0 | 51 | 36 | 99 |
| | 16 | 21.0 | 0.8 | 25 | 46 | 70 |
| | 17 | 22.7 | 0.9 | 38 | 43 | 85 |
| | 18 | 21.5 | 0.9 | 43 | 45 | 63 |
| | 19 | 22.2 | 0.9 | 47 | 50 | 55 |
| | 20 | 22.5 | 0.8 | 40 | 28 | 42 |

TABLE 4

| classification | basic material | coating | | | airtightness deficiency ratio |
|---|---|---|---|---|---|
| | | materials | thickness | roughening treatment | |
| Example 7 | SPCC | copper | 1 μm | sand-blasting | 0/50 |
| Example 8 | SPCC | none | 0 | sand-blasting | 12/50 |
| | | copper | 1 | | 0/50 |
| | | | 3 | | 0/50 |
| | | | 10 | | 0/50 |
| | | | 1 | none | 18/50 |
| | | | 3 | | 13/50 |
| | | | 10 | | 17/50 |
| Example 9 | SPCC | copper | 1 | electrolytic etching | 0/50 |
| | | | 3 | | 0/50 |
| | | | 10 | | 0/50 |

TABLE 5

| classification | basic material | coating materials | coating thickness | roughening treatment | airtightness deficiency ratio |
|---|---|---|---|---|---|
| Comparative Example 2 | SPCC + copper coating 3 μm | none tin | 0 μm | sand-blasting | 0/50 |
| | | | 1 | | 20/50 |
| | | | 3 | | 32/50 |
| | | | 10 | | 43/50 |
| | | | 1 | sand-blasting (strong) | 0/50 |
| | | | 3 | | 0/50 |
| | | | 10 | | 33/50 |
| | | | 1 | none | 22/50 |
| | | | 3 | | 29/50 |
| | | | 10 | | 49/50 |
| Comparative Example 3 | nickel plate | none copper | 0 | sand-blasting | 18/50 |
| | | | 1 | | 0/50 |
| | | | 3 | | 0/50 |
| | | | 10 | | 0/50 |

It is understood that various other modifications will be pparent to and can be readily made by those skilled in the art without departing from the scope and spite of this invention. Accordingly it is not intended that the scope of the claims appended hereto be limited to the description as set form the herein, but rather that the claims be construed as encompassing all the features of patentable novelty that reside in the present invention, including all features that would be treated as equivalents thereof by those skilled in the art to which this invention pertains.

What is claimed is:

1. A solid electrolytic capacitor comprising an outer molded casing, a plurality of capacitor elements each having a dielectric layer consisting of a positive electrode oxide film on a planar valve metal, a conductive macromolecular layer and a conductive layer overlying the conductive macromolecular layer at a predetermined portion of the dielectric layer, and two pairs of two-terminal external connectors of a plate shape, facing each other and connected to one of the capacitor elements, each having a positive electrode and a negative electrode, each pair of two-terminal external connectors including a positive electrode and a negative electrode, the external connectors being extending from opposite exposed sides of the outer molded casing and bent over exposed sides of the outer molded casing against a surface of the outer molded casing to position all pairs of the two-terminal external connectors on a side of the outer molded casing between said opposite exposed sides.

2. A solid electrolytic capacitor according to claim 1, wherein the casing is provided with grooves against which the external connectors are bent, said grooves being deeper than thickness of the external connectors and wider than a width of the external connectors, said external connectors extending from exposed opposite sides of the outer molded casing and bent over the surface of the casing and within the grooves.

3. A solid electrolytic capacitor comprising an outer casing, a dielectric positive electrode oxide film on a planar valve metal, a capacitor element having a conductive macromolecular layer and a conductive layer overlying the conductive macromolecular layer at a predetermined portion of the dielectric positive oxide film, the capacitor elements being laminated to form a laminate in which exposed portions of the dielectric positive oxide film layers are mutually overlaid and the conductive layers are mutually overlaid with gaps therebetween being electrically filled in with a conductive adhesive and two pairs of two-terminal external connectors each having a positive electrode and a negative electrode, the external connectors being extended from opposite sides of the casing and bent over other side than the opposite sides.

4. A solid electrolytic capacitor according to claim 3, wherein the casing is provided with grooves on the surface in along which the external connectors are bent below the level of the grooved surface.

5. A method for producing a solid electrolytic capacitor, the method comprising the steps of preparing a valve metal plate, forming an oxide film layer on the valve metal plate, dividing the surface of the valve metal plate into a negative electrode section and a positive electrode section by an insulating layer, forming a conductive laminate including a conductive material coated layer, a conductive macromolecular layer, a graphite layer, and a silver paint layer in the negative electrode section so as to form a capacitor element laminating a plurality of the capacitor elements wherein the negative electrode section is connected a conductive frame, and connecting the positive electrode section to another portion of the frame, bending a top end other portion of the frame at 180° until the bent portion pinches the positive electrode sections kept contact with each other, welding the frame to the capacitor elements by laser, and encasing the capacitor elements and part of the frame in a casing.

6. A method for producing a solid electrolytic capacitor, the method comprising the steps of preparing a valve metal plate, forming an oxide film layer on the valve metal plate, forming a capacitor element including a conductive material coated layer, a conductive macromolecular layer, and a conductive layer at a predetermined portion of the valve metal plate, connecting both a valve metal plate portion of the capacitor element or a laminate thereof and the conductive layer to a conductive frame functioning as a lead, and encasing the capacitor element of the laminate thereof and part of the frame in a casing, therein the surface of the frame is coated with copper and roughened.

7. A solid electrolytic capacitor according to claim 6, wherein the surface of the frame is roughened by a sand blasting method.

8. A solid electrolytic capacitor according to claim 6, wherein the surface of a frame is roughened by an electrolytic etching method.

* * * * *